(12) United States Patent
Kato

(10) Patent No.: US 12,621,635 B2
(45) Date of Patent: May 5, 2026

(54) INFORMATION PROCESSING DEVICE AND INFORMATION PROCESSING METHOD

(71) Applicants: TOYOTA JIDOSHA KABUSHIKI KAISHA, Toyota (JP); MATSUO INDUSTRIES, INC., Nagoya-shi (JP)

(72) Inventor: Hiroshi Kato, Nagoya (JP)

(73) Assignees: TOYOTA JIDOSHA KABUSHIKI KAISHA, Toyota (JP); MATSUO INDUSTRIES, INC., Nagoya (JP)

( * ) Notice: Subject to any disclaimer, the term of this patent is extended or adjusted under 35 U.S.C. 154(b) by 140 days.

(21) Appl. No.: 18/407,850

(22) Filed: Jan. 9, 2024

(65) Prior Publication Data

US 2024/0259771 A1 Aug. 1, 2024

(30) Foreign Application Priority Data

Jan. 30, 2023 (JP) ................................. 2023-011806

(51) Int. Cl.
| | |
|---|---|
| *H04W 4/46* | (2018.01) |
| *H04W 4/18* | (2009.01) |
| *H04W 4/44* | (2018.01) |

(52) U.S. Cl.
CPC ............... *H04W 4/18* (2013.01); *H04W 4/44* (2018.02); *H04W 4/46* (2018.02)

(58) Field of Classification Search
CPC ........... H04W 4/18; H04W 4/44; H04W 4/46; H04W 56/001; H04W 56/004; H04J 3/0638
See application file for complete search history.

(56) References Cited

U.S. PATENT DOCUMENTS

| | | | | |
|---|---|---|---|---|
| 9,568,943 | B1 * | 2/2017 | Carman | ................ G06F 3/0619 |
| 2015/0092797 | A1 * | 4/2015 | Aweya | ................. H04J 3/0667 |
| | | | | 370/516 |
| 2015/0146605 | A1 * | 5/2015 | Rubin | ................. G08G 1/0969 |
| | | | | 370/312 |
| 2016/0277911 | A1 * | 9/2016 | Kang | .................... H04W 16/28 |
| 2019/0273957 | A1 * | 9/2019 | Bohm | ................. H04J 3/0667 |

FOREIGN PATENT DOCUMENTS

JP 2010-251989 A 11/2010

* cited by examiner

*Primary Examiner* — Rebecca E Song
*Assistant Examiner* — Nicholas Richard Graepel
(74) *Attorney, Agent, or Firm* — Finnegan, Henderson, Farabow, Garrett and Dunner, LLP

(57) ABSTRACT

An information processing device includes a control unit that executes: acquiring, from a first device, third information including information about a time when first information is transmitted and a time when second information is received; acquiring, from a second device, fourth information including information about a time when the first information is received and a time when the second information is transmitted; and correcting a time included in the third information or the fourth information such that a time period from the time when the first device transmits the first information to the time when the second device receives the first information is equal to a time period from the time when the second device transmits the second information to the time when the first device receives the second information.

5 Claims, 5 Drawing Sheets

START

S101 — ACQUIRE THIRD INFORMATION

S102 — ACQUIRE FOURTH INFORMATION

S103 — EXTRACT TL1 AND TL2

S104 — EXTRACT TR1 AND TR2

S105 — CALCULATE CORRECTION VALUE

S106 — CORRECT AFTER SUBTRACTING CORRECTION VALUE FROM TIME OF THIRD INFORMATION

END

INFORMATION PROCESSING DEVICE AND INFORMATION PROCESSING METHOD

CROSS-REFERENCE TO RELATED APPLICATION

This application claims priority to Japanese Patent Application No. 2023-011806 filed on Jan. 30, 2023, incorporated herein by reference in its entirety.

BACKGROUND

1. Technical Field

The present disclosure relates to an information processing device and an information processing method.

2. Description of Related Art

Receiving time information transmitted from the outside, such as a global positioning system (GPS) signal and the like, during communication between a plurality of vehicles, and including the received time information in a radio signal transmitted to another vehicle (for example, refer to Japanese Unexamined Patent Application Publication No. 2010-251989 (JP 2010-251989 A)) is known.

SUMMARY

Once the time information is transmitted, no other information that matches the amount of the time information can be transmitted. An object of the present disclosure is to correct a time axis while suppressing an increase in information to be transmitted.

An aspect of the present disclosure provides an information processing device including a control unit that executes: acquiring, from a first device, third information including information about a time when first information is transmitted and a time when second information is received; acquiring, from a second device, fourth information including information about a time when the first information is received and a time when the second information is transmitted; and correcting a time included in the third information or the fourth information such that a time period from the time when the first device transmits the first information to the time when the second device receives the first information is equal to a time period from the time when the second device transmits the second information to the time when the first device receives the second information.

Further, other aspects of the present disclosure represent an information processing method in which a computer executes processes of the information processing device, a program for causing the computer to execute the processes, and a storage medium that stores the program non-temporarily.

According to the present disclosure, it is possible to correct the time axis while suppressing an increase in information to be transmitted.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Time synchronization may be required when a plurality of vehicles communicate with each other. Here, since signal connection cannot be made during a travelling test of a vehicle, it may be difficult to synchronize a time. For example, it is conceivable to acquire information about an absolute time from a GPS system mounted in the vehicle. However, there is an upper limit for an amount of data that can be transmitted. Therefore, when the information about the absolute time is added to the communication between the vehicles, no other data can be transmitted.

Therefore, the information processing device according to the present disclosure includes a control unit that executes: acquiring, from a first device, third information including information about a time when first information is transmitted and a time when second information is received; acquiring, from a second device, fourth information including information about a time when the first information is received and a time when the second information is transmitted; and correcting a time included in the third information or the fourth information such that a time period from the time when the first device transmits the first information to the time when the second device receives the first information is equal to a time period from the time when the second device transmits the second information to the time when the first device receives the second information.

The control unit corrects the time, assuming that time period required for the first information to reach the second device from the first device to be equal to time period required for the second information to reach the first device from the second device. When correcting the time, the time of at least one of the third information and the fourth information is corrected. That is, the time of at least one of the third information and the fourth information is corrected such that the time period required for the first information to reach the second device from the first device is equal to the time period required for the second information to reach the first device from the second device. The first information is, for example, information regarding a request or inquiry, and the second information is information regarding a reply to the request or inquiry. In this way, it is possible to easily align a time axis of the third information and a time axis of the fourth information without including information about the absolute time in the third information and the fourth information.

Hereinafter, embodiments of the present disclosure will be described with reference to the drawings. The configurations of the following embodiments are illustrative, and the present disclosure is not limited to the configurations of the embodiments.

First Embodiment

Figure 1:
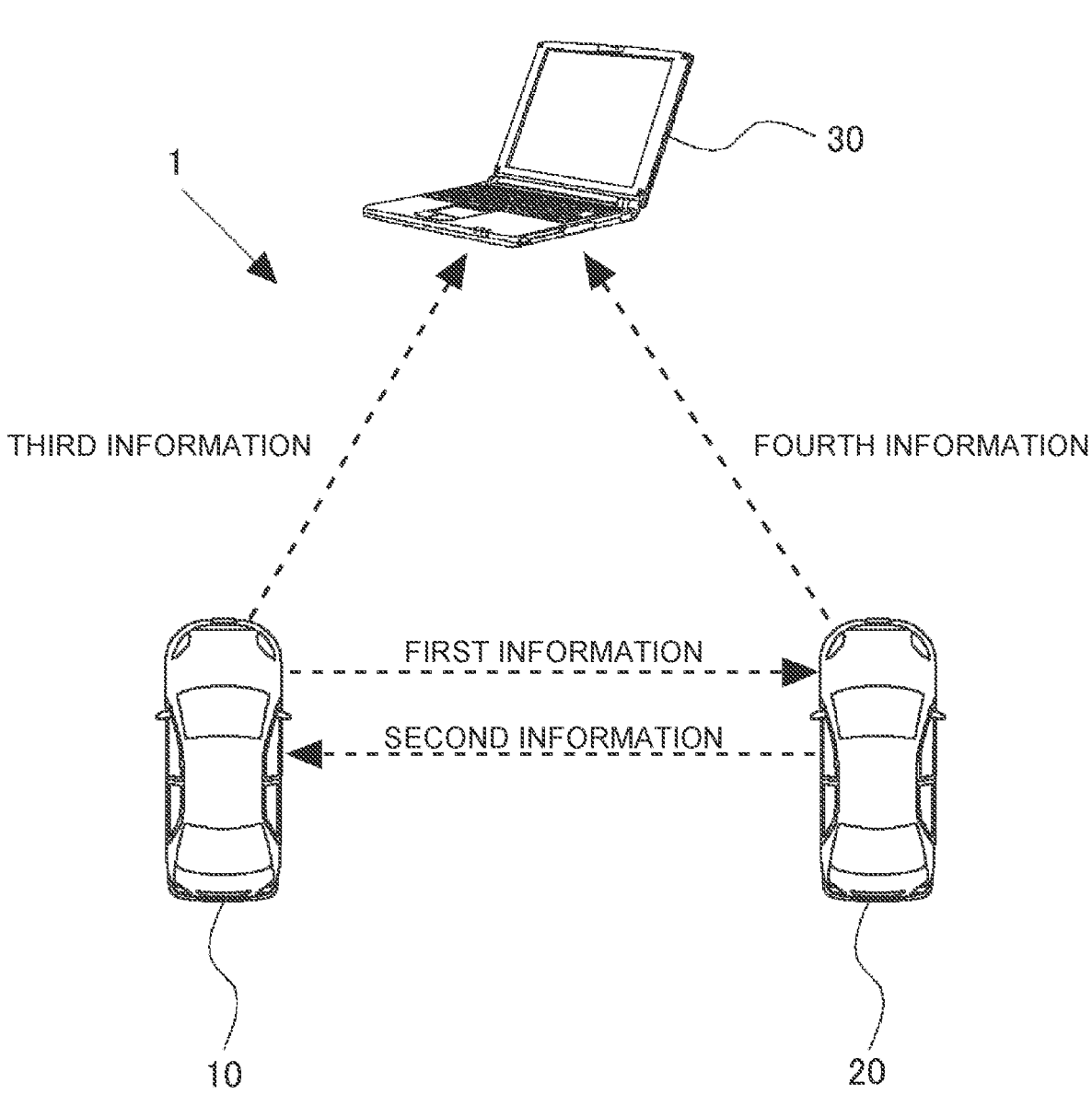
FIG. 1 is a diagram showing a schematic configuration of a system according to an embodiment.

FIG. 1 is a diagram showing a schematic configuration of a system 1 according to the embodiment. FIG. 1 shows a first vehicle 10, a second vehicle 20, and a user terminal 30. The first vehicle 10 and the second vehicle 20 are, for example, connected cars and are vehicles that are capable of vehicle-to-vehicle communication (V2V).

The first vehicle 10 and the second vehicle 20 transmit/receive information with each other, during a travelling test of an advanced driver-assistance system (ADAS), for example. Hereinafter, information transmitted from the first vehicle 10 to the second vehicle 20 is referred to as the first information, and information transmitted from the second vehicle 20 to the first vehicle 10 is referred to as the second information. For example, the first information is information about a request from the first vehicle 10 to the second vehicle 20, and the second information is information about a reply from the second vehicle 20 to the first vehicle 10. Then, the times when the first information and the second information are transmitted/received are associated with the transmitted/received information, and are stored as the third information in the first vehicle 10 and as the fourth information in the second vehicle 20, respectively. The third information and the fourth information are, for example, logs recording the times when the first information and the second information were transmitted/received.

The user terminal 30 performs analysis by acquiring the third information from the first vehicle 10 and acquiring the fourth information from the second vehicle 20. For example, the user terminal 30 analyzes whether the second vehicle 20 has transmitted an appropriate reply in response to the request from the first vehicle 10. At this time, the user terminal 30 performs correction to align the time axis of the third information with the time axis of the fourth information. The correction may be performed by shifting at least one of the time axis of the third information and the time axis of the fourth information.

Figure 2:
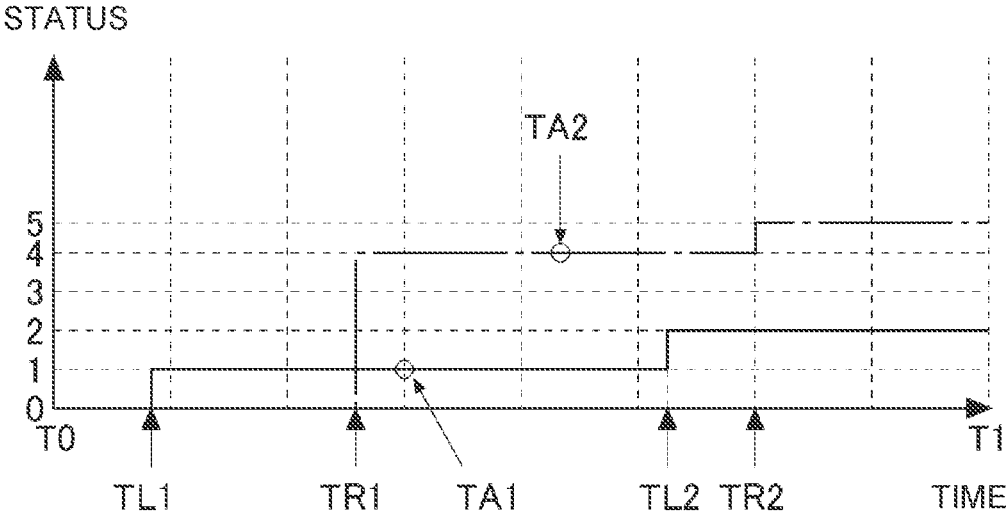
FIG. 2 is a diagram showing transmission/reception times of first information and second information before times included in third information and fourth information are corrected.
Figure 3:
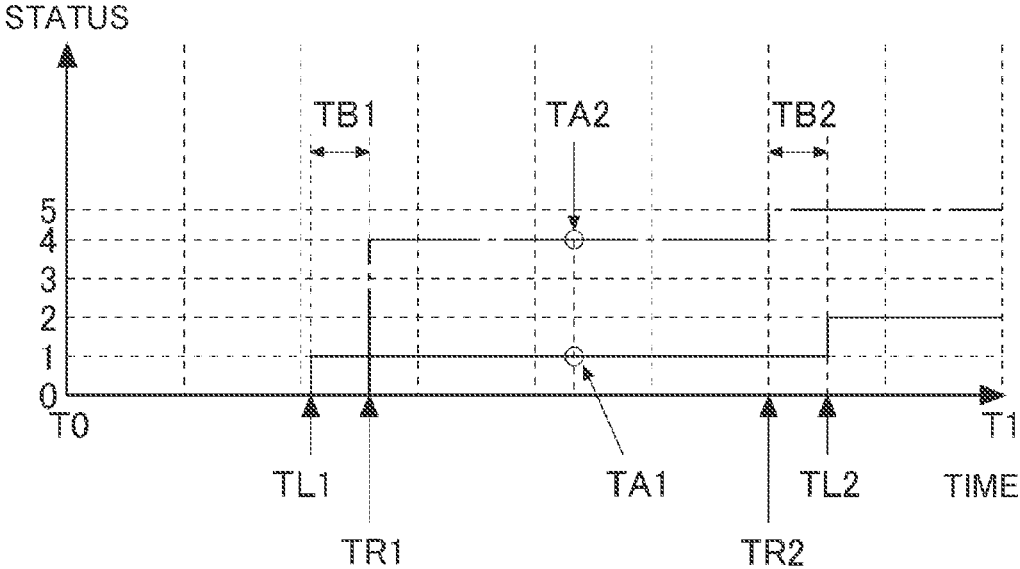
FIG. 3 is a diagram showing the transmission/reception times of the first information and the second information after correcting the time.

FIG. 2 is a diagram showing transmission/reception times of the first information and the second information before the times included in the third information and the fourth information are corrected. On the other hand, FIG. 3 is a diagram showing the transmission/reception times of the first information and the second information after correcting the time. The horizontal axis indicates a time period from T0 to T1, and the vertical axis indicates a status. The status represents processing performed by the first vehicle 10 and the second vehicle 20 replaced by numbers. The number 1 indicates the transmission of the first information, the number 2 indicates the reception of the second information, the number 4 indicates the reception of the first information, and the number 5 indicates the transmission of the second information.

In FIGS. 2 and 3, continuous lines correspond to the third information, and dashed-dotted lines correspond to the fourth information. Also, TL1 indicates a time when the first vehicle 10 transmits the first information, TL2 indicates a time when the first vehicle 10 receives the second information, TR1 indicates a time when the second vehicle 20 receives the first information, and TR2 indicates a time when the second vehicle 20 transmits the second information. A time period from TL1 to TL2 is a time period from the time when the first vehicle 10 transmits the first information to the time when the first vehicle 10 receives the second information, and a time period from TR1 to TR2 is a time period from the time when the second vehicle 20 receives the first information to the time when the second vehicle 20 transmits the second information.

Here, in FIG. 2, the times of the third information and the fourth information are not synchronized. Therefore, for example, the time TL2 at which the first vehicle 10 receives the second information is earlier than the time TR2 at which the second vehicle 20 transmits the second information. Thus, the user terminal 30 corrects the time. At this time, the time axis of the third information is shifted in the later direction (to the right in FIG. 2) so that a time period TB1 from TL1 to TR1 and a time period TB2 from TR2 to TL2 are equal. Note that, as another method, the time axis of the fourth information may be shifted in the earlier direction (to the left in FIG. 2). At this time, for example, when the midpoint between the time TL1 at which the first vehicle 10 transmits the first information and the time TL2 at which the first vehicle 10 receives the second information is set as TA1, and the middle point between the time TR1 at which the second vehicle 20 receives the first information and the time TR2 at which the second vehicle 20 transmits the second information is set as TA2, the time axis of at least one of the third information and the fourth information is shifted so that TA1 coincides with TA2. Thus, the user terminal 30 corrects the time axis of at least one of the third information and the fourth information.

Figure 4:
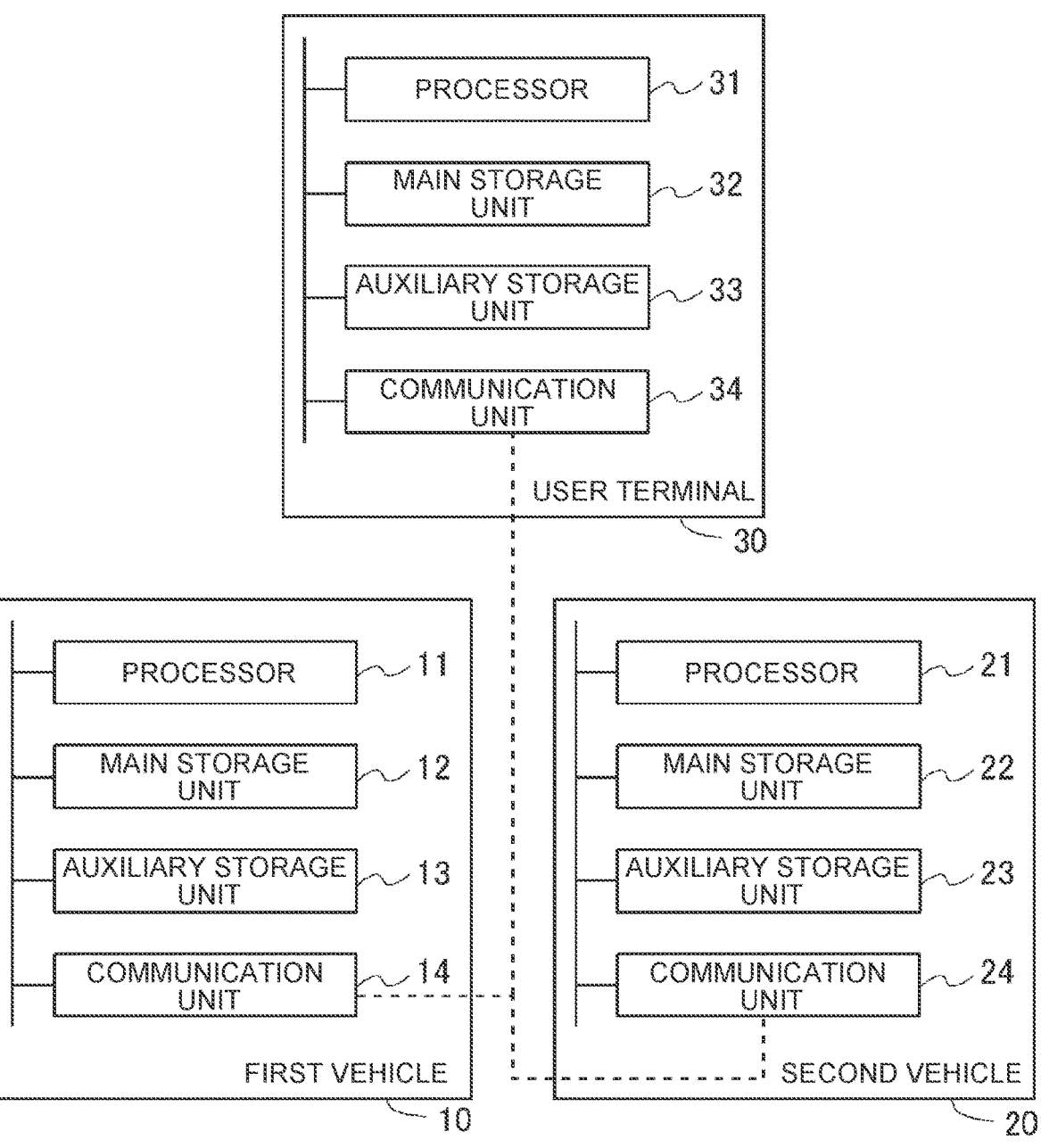
FIG. 4 is a block diagram schematically showing an example of configurations of a first vehicle, a second vehicle, and a user terminal that constitute a system.

FIG. 4 is a block diagram schematically showing an example of configurations of the first vehicle 10, the second vehicle 20, and the user terminal 30 that constitute the system 1. Note that, since the first vehicle 10 and the second vehicle 20 have the same configuration as the user terminal 30, the user terminal 30 will be mainly described. The user terminal 30 has a computer configuration. The user terminal 30 includes a processor 31, a main storage unit 32, an auxiliary storage unit 33, and a communication unit 34. The components are connected to each other by a bus. The processor 31 is a central processing unit (CPU), a digital signal processor (DSP), and the like. Note that the processor 31 of the user terminal 30 is an example of the control unit.

The main storage unit 32 is a random access memory (RAM), a read-only memory (ROM), and the like. The auxiliary storage unit 33 is an erasable programmable ROM (EPROM), a hard disk drive (HDD), a removable medium, and the like. The auxiliary storage unit 33 stores an operating system (OS), various programs, various tables, and the like. The processor 31 loads the program stored in the auxiliary storage unit 33 into the work area of the main storage unit 32 and executes the program. Through execution of the program, each component and the like are controlled. The main storage unit 32 and the auxiliary storage unit 33 are computer-readable recording media. The communication unit 34 is, for example, a circuit for communicating with the first vehicle 10 and the second vehicle 20. Note that, a communication unit 14 of the first vehicle 10 and a communication unit 24 of the second vehicle 20 are configured to perform wireless communication, and the communication unit 34 of the user terminal 30, the communication unit 14 of the first vehicle 10, and the communication unit 24 of the second vehicle 20 are configured to perform wireless communication or wired communication.

Figure 5:
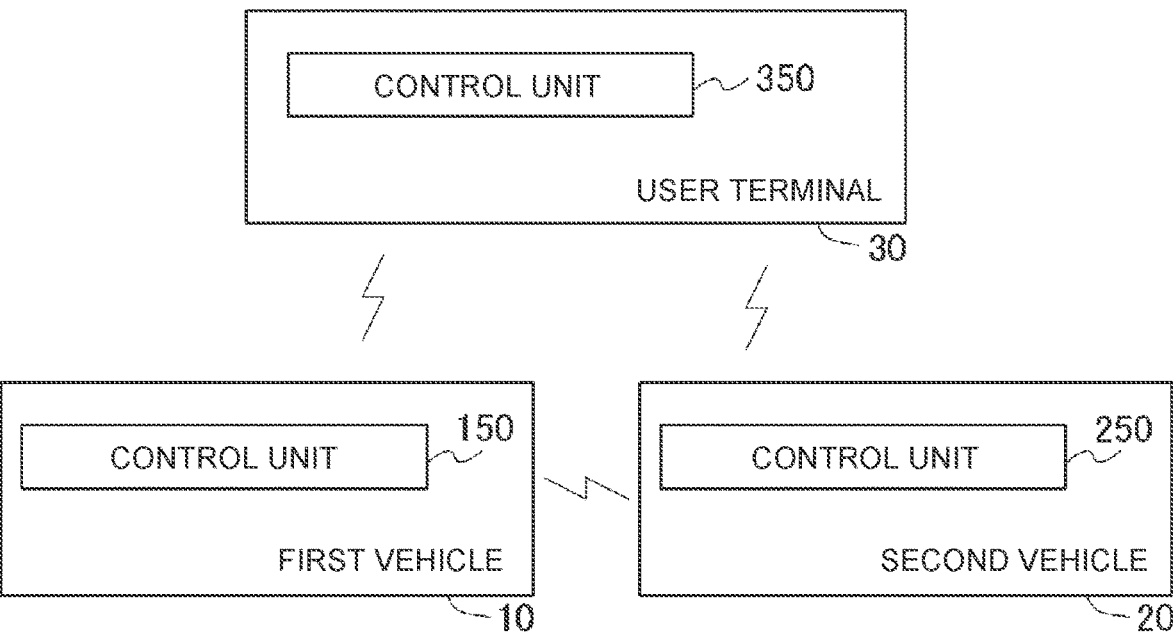
FIG. 5 is a diagram showing an example of functional configurations of the first vehicle, the second vehicle, and the user terminal.

Next, FIG. 5 is a diagram showing an example of functional configurations of the first vehicle 10, the second vehicle 20, and the user terminal 30. The user terminal 30 includes a control unit 350 as a functional component. The control unit 350 is, for example, a functional component provided by the processor 31 of the user terminal 30 executing various programs stored in the auxiliary storage unit 33.

The control unit 350 collects information from the first vehicle 10 and the second vehicle 20. For example, the control unit 350 requests the first vehicle 10 to output the third information, and requests the second vehicle 20 to output the fourth information, triggered by a predetermined operation of the user on the user terminal 30.

The control unit 350 that has acquired the third information and the fourth information performs correction to align the time axes of the third information and the fourth information. The correction is performed, assuming that the time period from the time when the first vehicle 10 transmits the first information to the time when the second vehicle 20 receives the first information (that is, a time period required for the first information to reach the second vehicle 20 from the first vehicle 10) is equal to the time period from the time when the second vehicle 20 transmits the second information to the time when the first vehicle 10 receives the second information (that is, a time period required for the second information to reach the first vehicle 10 from the second vehicle 20). Also, the communication speed is assumed to be constant.

As shown in FIGS. 2 and 3, the formula for calculating a correction value when correcting the time axis of the third information of the first vehicle 10 is as follows.

$$\text{Correction value} = ((TL1 - TR1) + (TL2 - TR2))/2 \qquad \text{(Formula 1)}$$

By subtracting the correction value from the time of the third information of the first vehicle 10, the time of the third information is corrected.

$$\text{Time after correction} = (\text{Time of third information}) - ((TL1 - TR1) + (TL2 - TR2))/2 \qquad \text{(Formula 2)}$$

Also, the first vehicle 10 includes a control unit 150 as a functional component. The control unit 150 is, for example, a functional component provided by a processor 11 of the first vehicle 10 executing various programs stored in an auxiliary storage unit 13. The control unit 150 of the first vehicle 10, for example, generates the first information based on the driver's input and transmits the first information to the second vehicle 20. At this time, the status and the time are linked and added to the third information. In the example shown in FIG. 2, the status at this time is "1" and the time is TL1. Further, when receiving the second information from the second vehicle 20, the control unit 150 associates the second information with the status and the time and adds them to the third information. In the example shown in FIG. 2, the status at this time is "2" and the time is TL2. When there is a request from the user terminal 30 to output the third information, the third information is output to the user terminal 30.

The second vehicle 20 includes a control unit 250 as a functional component. The control unit 250 is, for example, the functional component provided by a processor 21 of the second vehicle 20 executing various programs stored in an auxiliary storage unit 23. For example, when receiving the first information from the first vehicle 10, the control unit 250 of the second vehicle 20 generates the second information and transmits the second information to the first vehicle 10. At this time, the status and the time are linked and added to the fourth information. In the example shown in FIG. 2, when the control unit 250 receives the first information from the first vehicle 10, the status is "4" and the time is TR1. Also, when the control unit 250 transmits the second information to the first vehicle 10, the status is "4" and the time is TR2. Then, when there is a request from the user terminal 30 to output the fourth information, the fourth information is output to the user terminal 30.

Figure 6:
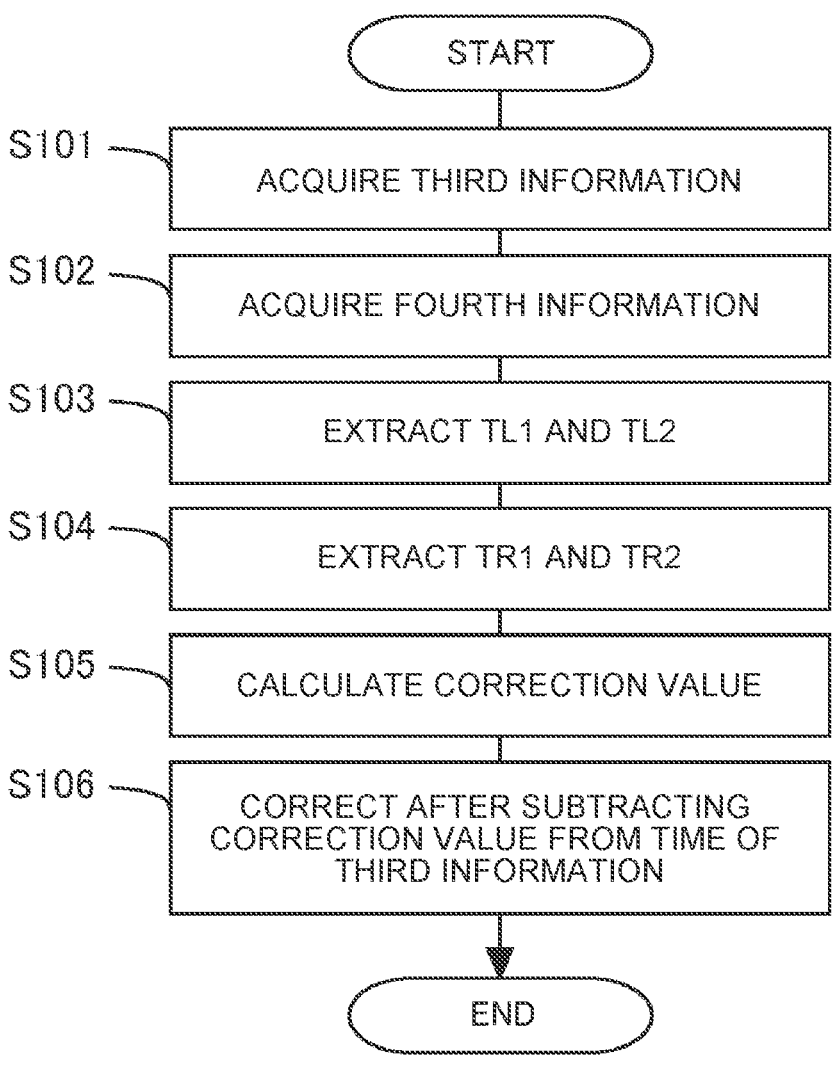
FIG. 6 is a flowchart of processing for correcting time axes of the third information and the fourth information.

Next, the flow of processing for correcting the time axes of the third information and the fourth information will be described. FIG. 6 is a flowchart of processing for correcting the time axes of the third information and the fourth information. The present routine is executed when the user operates to execute a predetermined program in the user terminal 30. Note that, the description will be made on the assumption that the third information is generated in the first vehicle 10 and the fourth information is generated in the second vehicle 20.

In step S101, the control unit 350 acquires the third information from the first vehicle 10. Since the third information is stored in the auxiliary storage unit 13 of the first vehicle 10, the control unit 350 acquires the third information by transmitting a command to transmit the third information to the first vehicle 10.

In step S102, the control unit 350 acquires the fourth information from the second vehicle 20. Since the fourth information is stored in the auxiliary storage unit 23 of the second vehicle 20, the control unit 350 acquires the fourth information by transmitting a command to transmit the fourth information to the second vehicle 20.

In step S103, the control unit 350 extracts, from the third information, the time TL1 at which the first information is transmitted and the time TL2 at which the second information is received. For example, as shown in FIG. 2, the control unit 350 extracts a time when the status changes from 0 to 1 as the time TL1 at which the first information is transmitted. Also, for example, as shown in FIG. 2, the control unit 350 extracts a time when the status changes from 1 to 2 as the time TL2 at which the second information is received.

In step S104, the control unit 350 extracts, from the fourth information, the time TR1 at which the first information is received and the time TR2 at which the second information is transmitted. For example, as shown in FIG. 2, the control unit 350 extracts a time when the status changes from 0 to 4 as the time TR1 at which the first information is received. Also, for example, as shown in FIG. 2, the control unit 350 extracts a time when the status changes from 4 to 5 as the time TR2 at which the second information is transmitted.

In step S105, the control unit 350 calculates the correction value according to the above Formula 1. Then, in step S106, the control unit 350 corrects the time of the third information according to the above Formula 2. At this time, the information regarding the time included in the third information may be rewritten to the corrected time. Then, the third information after correcting the time is stored in the auxiliary storage unit 33, or output to another functional component, or output to another device. Also, as another method, the analysis result may be output after the control unit 350 performs a predetermined analysis based on the third information and the fourth information after correcting the time axis.

In this way, the time of the data acquired from the first vehicle 10 and the second vehicle 20 can be aligned. Therefore, even when the time cannot be synchronized while the first vehicle 10 and the second vehicle 20 are travelling, or even when it is difficult to include information about the absolute time in the third information and the fourth information, the time can be aligned before the data analysis.

Other Embodiments

The above-described embodiment is merely an example, and the present disclosure may be appropriately modified and implemented without departing from the scope thereof. The processes and means described in the present disclosure can be freely combined and implemented as long as no technical contradiction occurs.

Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function. In the above-described embodiment, description has been made using the vehicle as an example. However, the present disclosure can also be applied to a configuration other than the vehicle when correction is performed for aligning the time axes of two systems.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. The non-transitory computer-readable storage medium is, for example, a disc of any type such as a magnetic disc (floppy (registered trademark) disc, hard disk drive (HDD), etc.), an optical disc (compact disc read-only memory (CD-ROM), digital versatile disc (DVD), Blu-ray disc, etc.), a read only memory (ROM), a random access memory (RAM), an erasable programmable read only memory (EPROM), an electrically erasable programmable read only memory (EEPROM), a magnetic card, a flash memory, an optical card, and any type of medium suitable for storing electronic commands.

What is claimed is:

1. An information processing device comprising a processor that executes:

acquiring, from a first device, third information including information about a first time when first information is transmitted and a second time when second information is received;

acquiring, from a second device, fourth information including information about a third time when the first information is received and a fourth time when the second information is transmitted; and correcting the first time or the second time included in the third information, or the third time or the fourth time included in the fourth information, such that a time period from the first time when the first device transmits the first information to the third time when the second device receives the first information is equal to a time period from the fourth time when the second device transmits the second information to the second time when the first device receives the second information, wherein the correcting includes shifting at least one of a first time axis of the third information or a second time axis of the fourth information such that a first middle point between the first time and the second time coincides with a second middle point between the third time and the fourth time.

2. The information processing device according to claim 1, wherein the second information is information transmitted by the second device in response to the first information.

3. The information processing device according to claim 1, wherein the first device is a first communication unit of a first vehicle and the second device is a second communication unit of a second vehicle.

4. An information processing method, wherein a computer executes:

acquiring, from a first device, third information including information about a first time when first information is transmitted and a second time when second information is received;

acquiring, from a second device, fourth information including information about a third time when the first information is received and a fourth time when the second information is transmitted; and correcting the first time or the second time included in the third information, or the third time or the fourth time included in the fourth information, such that a time period from the first time when the first device transmits the first information to the third time when the second device receives the first information is equal to a time period from the fourth time when the second device transmits the second information to the second time when the first device receives the second information, wherein the correcting includes shifting at least one of a first time axis of the third information or a second time axis of the fourth information such that a first middle point between the first time and the second time coincides with a second middle point between the third time and the fourth time.

5. The information processing method according to claim 4, wherein the first device is a first communication unit of a first vehicle and the second device is a second communication unit of a second vehicle.

* * * * *